United States Patent [19]

Carlson et al.

[11] 3,927,336

[45] Dec. 16, 1975

[54] SELF-ADJUSTING CONDITION-RESPONSIVE CONTROL CIRCUIT

[75] Inventors: Paul A. Carlson, New Providence, N.J.; Arthur F. Cake, Greenwich, Conn.

[73] Assignee: Wagner Electric Corporation, Parsippany, N.J.

[22] Filed: Mar. 27, 1974

[21] Appl. No.: 455,064

[52] U.S. Cl. ................ 307/308; 307/116; 307/310; 317/146 R; 317/148.5 R; 328/3; 331/177 R

[51] Int. Cl.² .................... H01L 31/00; G05D 23/19

[58] Field of Search ........... 307/308, 310, 116, 117; 331/65, 177 V, 177 R, 66; 317/DIG. 2, DIG. 3, 146 R, 148.5 R; 328/2, 5, 3

[56] References Cited

UNITED STATES PATENTS

| | | | |
|---|---|---|---|
| 3,435,298 | 3/1969 | Atkins et al. | 307/308 X |
| 3,562,668 | 2/1971 | Bartlett et al. | 331/177 R X |
| 3,564,346 | 2/1971 | Atkins | 307/308 X |
| 3,727,149 | 4/1973 | Kimura | 331/177 V X |
| 3,747,011 | 7/1973 | Buck | 328/5 X |
| 3,842,371 | 10/1974 | Kelley | 331/177 R X |

*Primary Examiner*—Alfred L. Brody
*Attorney, Agent, or Firm*—Eyre, Mann & Lucas

[57] ABSTRACT

The output of an oscillator is normally continually varied within predetermined limits in response to a control signal to compensate for slow variations from a reference level of a monitored parameter, and is further varied in response to a rapid variation of the monitored parameter from its existing reference level. A transistorized, self-biasing switching circuit is normally alternately turned on and off when the oscillator output is within predetermined limits and otherwise provides a constant output. The pulsed output of the switching circuit is clamped and fed to a solid state control circuit which provides the control signal to continually vary the oscillator output. In the absence of a rapid variation of the monitored parameter from its existing reference level, the circuit "hunts" about the existing reference level and compensates for both slow variations of the monitored parameter from the reference level and drift in values of circuit elements by adjusting the reference level. When a rapid variation from the existing reference level of the monitored parameter occurs, the constant switching circuit output causes a load-controlling circuit to change the energization state of a load.

20 Claims, 1 Drawing Figure

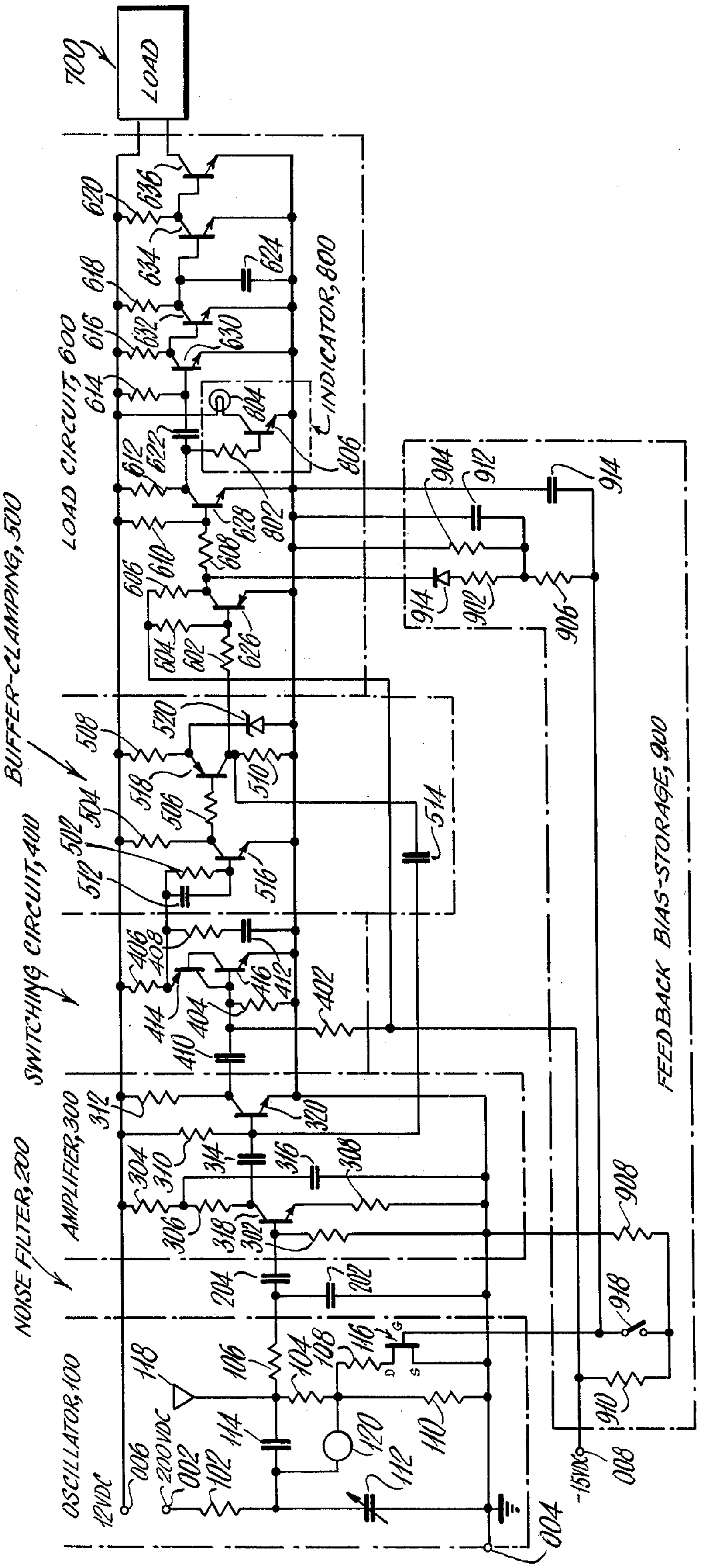
LOAD
700
LOAD CIRCUIT, 600
INDICATOR, 800
BUFFER-CLAMPING, 500
SWITCHING CIRCUIT, 400
AMPLIFIER, 300
NOISE FILTER, 200
OSCILLATOR, 100
FEEDBACK BIAS-STORAGE, 900
12VDC
200VDC
-15VDC

SELF-ADJUSTING CONDITION-RESPONSIVE CONTROL CIRCUIT

BACKGROUND OF THE INVENTION

1. Field of the Invention

The present invention is related to oscillator controlled electrical circuits.

2. Description of the Prior Art

Various control circuits responsive to a change in an electrical parameter, e.g., capacitance or resistance, are found in the prior art, and have numerous and diverse applications. U.S. Pat. No. 3,725,748 issued Apr. 3, 1973 in the name of C. E. Atkins made a significant advance over prior control circuits in that the condition-responsive control circuit disclosed therein automatically adjusted the reference level of the monitored parameter in response to slow changes in that parameter and in circuit element values, and which caused a change in the energization state of a load circuit in response to a rapid change in the monitored parameter. Control circuits prior to the circuit disclosed in the aforementioned U.S. Patent required careful adjustment in many applications, particularly since the magnitude of the signal to which the circuits were designed to respond was frequently quite small. Long term drift of the circuit elements provided an additional problem. The circuit disclosed in the aforementioned Patent required inter alia, a relay to effect control of the oscillator circuit and the energization state of the load circuit. The present invention is a significant technological advance over the invention disclosed in the aforementioned U.S. Patent in that the oscillator is controlled entirely by solid-state circuit means without electro-mechanical circuit elements, and the load-controlling circuit also comprises all solid-state circuit means without electro-mechanical circuit elements.

SUMMARY OF THE INVENTION

The present invention is embodied in and carried out by solid-state, self-adjusting condition-responsive control circuitry operative to provide first and second signal outputs, solid-state buffer-clamping circuitry and feedback, bias-storage circuitry to control an oscillator output, and solid-state load-controlling circuitry operative to change the energization state of the load in response to predetermined values of the first and second signal outputs of the switching circuitry.

BRIEF DESCRIPTION OF THE DRAWING

A better understanding of the present invention may be had by reference to the accompanying drawing, which is a schematic diagram of a circuit which is the preferred embodiment of the present invention.

DESCRIPTION OF THE PREFERRED EMBODIMENT

Referring now specifically to the drawing, a source of positive high voltage DC power (high voltage supply) is connected between input terminals 002 and 004, a source of positive low voltage DC power (positive low voltage supply) is connected between input terminals 006 and 004, and a source of negative low voltage DC power (negative low voltage supply) is connected between input terminals 008 and 004. Terminal 004 is preferably grounded. The high voltage is applied to the low frequency relaxation oscillator 100, the basic embodiment of which is described and claimed in U.S. Pat. No. 3,199,033 (Atkins et al.), the disclosure of which is hereby incorporated by reference. The output of oscillator 100 normally comprises a series of continually varying pulses, which comprise the input to a two-stage, alternating current amplifier 300, preceded by a noise filter 200. The output of alternating-current amplifier 300 controls the conductivity of a normally non-conductive switching circuit 400. This self-biasing, positive hysteresis switching circuit is described and claimed in U.S. Pat. No. 3,508,120 (Atkins), the disclosure of which is hereby incorporated by reference. A buffer-clamping circuit 500 is connected to the output of switching circuit 400. The buffer-clamping circuit 500 is connected to a load circuit 600 connected to load 700 and to indicator 800. The feed-back, bias-storage circuit 900 which controls the oscillating circuit 300 is also connected to the load circuit.

The continually varying pulses from oscillator 300 are amplified in amplifier 300 and alternatiely energize and de-energize switching circuit 400 in conjunction with a bias voltage when the amplified pulses are greater than a predetermined magnitude. The alternate energization and de-energization of switching circuit 400 provides a pulsed voltage to the buffer-clamping circuit, which clamps the pulsed voltage at a predetermined level before feeding it to the load circuit. The clamped pulsed voltage is fed back to the oscillating circuit 100 through feedback bias-storage circuit 900. The feedback bias-storage circuit 900 comprises charging and discharging circuits for a control capacitor whose voltage controls oscillator 100 by biasing the gate electrode G of the metal-oxide-semi-conductor field-effect transistor (MOS FET) 116. Load circuit 600 maintains load 700 de-energized when the switching circuit 400 provides a pulsed voltage and energizes load 700 when the switching circuit output is constant. Indicator circuit 800 indicates in the load circuit the presence of a pulsed output from switching circuit 400 indicating an output from the oscillator 100 which is greater than a predetermined magnitude.

In operation, the output pulses of oscillator 100 are adjusted to be negative in polarity by means of variable capacitance 112, for example. These output pulses will vary in magnitude as the effective source S-to-drain D resistance of MOS FET 116 varies. However, the variations in magnitude must normally be within predetermined limitations related to the triggering thresholds of switching circuit 400, which must normally be alternately switched conductive and non-conductive to prevent energization of load 700. The output of oscillator 100 is fed to noise filter 200 comprising shunt capacitance 202 and series capacitance 204, and in turn to the two stage, alternating-current amplifier 300. The output pulses from amplifier 300, which are also of negative polarity and with the DC component removed by capacitor 410, are fed to switching circuit 400, which is alternately energized by pulses greater than a predetermined magnitude and not energized when the pulse magnitude falls below a predetermined value. The switching circuit 400 is normally biased non-conductive by a negative bias voltage applied to the base of transistor 416 through voltage division of the negative low voltage source by resistors 402 and 404. A positive pulse of predetermined magnitude which exists between the negative polarity pulses as a result of the AC coupling (capacitor 410) between amplifier 300 and switch 400 energizes switching circuit 400, the switch then turns itself off when the sustaining current from C412 falls below the required amount to maintain switch 400 in a conductive state. This alternate energization and de-energization of switching circuit 400 provides a positive polarity sawtooth voltage at the switching circuit output. The positive polarity sawtooth voltage is inverted to a negative polarity by first stage transistor 516 of buffer-clamping circuit 500, and is inverted to a positive polarity, and clamped by transistor 518 at a maximum voltage approximately equal to the zener breakdown voltage of zener diode 520, which is connected to the emitter of transistor 518. Feedback capacitor 514, connected between the collector of second stage transistor 518 of buffer-clamping circuit 500 and the base of the second stage transistor 320 of amplifier circuit 300, enhances operation of the circuit and constitutes a non-essential portion of the invention. The clamped positive polarity sawtooth voltage from buffer-clamping circuit 500 is fed to load circuit 600. First stage transistor 626 of load circuit 600 serves to invert and amplify the sawtooth voltage to provide a negative polarity sawtooth voltage. Also fed to transistor 626 at the base and collector thereof is a negative bias voltage derived from the negative low voltage source through resistors 604 and 606, respectively. This negative bias voltage serves to supply a negative DC voltage level to the collector output of transistor 626 when it amplifies and inverts the positive polarity sawtooth voltage to a negative polarity sawtooth voltage. The net result is that the positive polarity sawtooth voltage is amplified and inverted at the collector of 626 and provided with a negative DC component and is thereafter fed to feedback, bias-storage circuit 900. Feedback, bias-storage circuit 900 comprises diode 916 and control capacitor 912. When the collector output of transistor 626 goes negative (resulting from amplification and inversion of the positive polarity sawtooth voltage input and the negative-bias voltage), diode 916 is forward biased to close a charging path to capacitor 912 through diode 916. The charging path originates with the negative low voltage source and continues through resistor 606 to diode 916. During the time between the clamped pulses, transistor 626 is biased off and the net voltage at the collector output of transistor 626 results from the voltage division of the negative and positive low voltage source by resistors 606, 608 and 610, and the base junction of transistor 626. This net voltage is positive and back biases diode 916 to open the charging path to capacitor 912. At the same time, a discharge path is provided for capacitor 912 through resistor 904. Thus, a charging path for capacitor 912 is alternately closed and opened. As the negative charge of capacitor 912 increases during the charging period, a negative voltage increasing in magnitude is supplied to the gate of MOS FET 116 through resistor 906. Capacitor 914 enhances operation of the feedback, bias-storage circuit and constitutes a non-essential portion of the invention. When diode 916 is back biased to open the charging path, capacitor 912 discharges through resistor 904 to decrease the negative charge of capacitor 912 and correspondingly reduce the magnitude of the negative voltage supplied to the gate of MOS FET 116. As the gate bias of MOS FET 116 is alternately increased in negative magnitude and then decreased to approximately ground potential, the output pulses of oscillator 100 are respectively increased in negative magnitude and decreased to approximately ground potential. The charging time constant Tc associated with capacitor 912 must be less than the discharge time constant Td associated with capacitor 912 so that the charge across capacitor 912 is not continually increased, but rather falls to approximately zero during the time capacitor 912 discharges. Since zener diode 520 limits the maximum amplitude of the sawtooth voltage applied to the base of transistor 626, the maximum voltage to which capacitor 912 charges will be the same for each sawtooth voltage pulse. Consequently, the bias voltage swing applied to the gate of MOS FET 116 is fixed within predetermined limits, ranging between a negative bias voltage and an approximately ground bias voltage.

The circuit values associated with feedback, bias-storage circuit 900 and oscillator circuit 100 are chosen so that the hunting of oscillator 100 will fully compensate for the slow changes of the circuit values of the condition-responsive control circuit and environmental changes such as, for example, temperature.

Switch 918 is provided so that a predetermined negative bias voltage can be supplied to the gate of MOS FET 116 when the switch is in its closed position. Upon opening switch 918, hunting of the oscillator circuit will be commenced at a predetermined bias level supplied to the gate of MOS FET 116, which, accordingly, will commence the hunting at a predetermined oscillator pulse output voltage.

The variation in voltage swing supplied to the gate of MOS FET 116 and the circuit values of the oscillator and amplifier circuits are of course chosen to maintain the amplified oscillator output voltage within the threshold limits of switch 400 to thereby effect alternate energization and de-energization of the switch to provide a sawtooth voltage output. When the oscillator 100 output varies outside predetermined limits, switch 400 will be rendered either continually energized or continually de-energized in either case substituting a constant voltage for the previous sawtooth voltage. This will terminate searching and energize load circuit 600 as will be described hereinafter.

Connected to load circuit 600 is indicator circuit 800 which comprises a transistor 806 connected to an indicator. In the configuration chosen to illustrate the invention, the indicator is a bulb 804 connected at one end to the positive low voltage source and at the other end to transistor 806. When the clamped sawtooth voltage is present in the load circuit 600, transistor 806 is alternately switched on and off to alternately effectively connect one side of the bulb 804 to ground and to a source of high impedence thereby alternately energizing and de-energizing bulb 804.

The load circuit 600 operates as follows. Transistor 626 operates as described hereinabove. Transistor 628 inverts the negative polarity clamped sawtooth from transistor 626 to a positive polarity. Transistor 630 inverts the sawtooth to a negative polarity sawtooth voltage. The negative polarity sawtooth is fed to normally biased-on transistor 632. Connected to the collector of transistor 632 is capacitor 624. The value of capacitor 624 is chosen such that its time constant is very much greater than the width of the sawtooth pulse. Consequently the voltage across capacitor 624, which is normally of approximately ground potential as a result of transistor 632 being biased on, increases to only an insignificant value when the negative polarity sawtooth voltage attempts to turn transistor 632 off. Alternatively, it may be stated that the value of capacitor 624 is chosen so that it presents a low impedence to the positive polarity sawtooth (inverted by transistor 632) at the collector of transistor 632 to thereby prevent the voltage at this point from rising significantly during the width of the sawtooth pulse. This insignificant value of voltage impressed across capacitor 624 is less than what is required to turn transistor 634 on. Consequently, with transistor 634 turned off, its collector is at a positive voltage through resistor 620 from the low voltage source which is of sufficient magnitude to turn transistor 636 on. The load 700 is chosen so that it is de-energized when transistor 636 is turned on. This may be accomplished by providing a coil of a relay between the collector of transistor 638 and the low voltage source, which relay de-energizes the load when the coil is energized. The reason for choosing such an arrangement is that if power is removed from the condition-responsive circuit, the relay coil will become de-energized to thereby energize the load.

Thus far, operation of the circuit has been described with respect to hunting only, effected primarily by the feedback, bias-storage circuit and slow changes in circuit values or selected environmental conditions. When a rapid and relatively large change in detected capacitance occurs at sensor 118, the magnitude of the output pulses of oscillator 100 change drastically. Thus, when a large increase in capacity is detected at sensor 118, the magnitude of the output pulses of oscillator 100 fall below a predetermined value which when amplified by amplifier 300 fail to alternately energize and de-energize switch 400. When this happens, the output of switch 400 at the emitter of transistor 414 is at a constant DC voltage equal to the low voltage source voltage. With the absence of a sawtooth voltage at the collector of transistor 626, its output is at a positive voltage of approximately ground potential which opens the charging path to capacitor 912. This prevents hunting by oscillator 100. The absence of a sawtooth voltage at the input of transistor 632 turns transistor 632 off continually which allows the charge of capacitor 624 to rise to the level required to turn transistor 634 on. This decreases the voltage at the base input of transistor 636 to thereby turn it off and prevent any current flow between the collector of transistor 636 and the positive low voltage source. This energizes load 700. With the coil of the relay mentioned hereinabove connected between the collector of transistor 636 and the positive low voltage source, the load would be energized by de-energization of the coil, there being no current flow therethrough.

The values of the various components of the disclosed circuit which is the preferred embodiment of the present invention are as follows:

| Resistances | | Capacitances | | |
|---|---|---|---|---|
| 102 | 1.7M | 112 | 1500 | pf |
| 104 | 10K | 114 | .001 | μf |
| 106 | 6.8K | 202 | .001 | μf |
| 108 | 15K | 204 | .047 | μf |
| 110 | 22K | 314 | .22 | μf |
| 302 | 100K | 316 | 15 | μf |
| 304 | 220 | 410 | .47 | μf |
| 306 | 1K | 412 | .15 | μf |
| 308 | 47 | 512 | .22 | μf |
| 310 | 220K | 514 | .001 | μf |
| 312 | 4.7K | 622 | .47 | μf |
| 402 | 330K | 624 | 1000 | μf |
| 404 | 220K | 912 | 3 | μf |
| 406 | 470K | 914 | 100 | μf |
| 408 | 39 | | | |
| 502 | 220K | Diodes | | |
| 504 | 22K | | | |
| 506 | 100K | 520 | 1N | 4148 |

-continued

| Resistances | | Capacitances | |
|---|---|---|---|
| | | 916 | 1N 4148 |
| **Resistances** | | **Transistors** | |
| 508 | 6.9K | 2N5457 | 116 |
| 510 | 10K | 2N 3567 | 318, 320, 416, 516, 628, 630, 632, 634 |
| 602 | 470K | | |
| 604 | 1M | 2N3638 | 414, 518, 626 |
| 606 | 100K | | |
| 608 | 100K | **High Voltage Source** | |
| 610 | 330K | | |
| 612 | 10K | +200 v DC | |
| 614 | 100K | | |
| 616 | 10K | **Positive Low Voltage Source** | |
| 618 | 10K | | |
| 620 | 10K | +12 v DC | |
| 802 | 22K | | |
| 902 | 6.6M | **Negative Low Voltage Source** | |
| 904 | 44M | | |
| 906 | 100K | −15 v DC | |
| 908 | 10M | | |
| 910 | 620K | | |

The advantages of the present invention, as well as certain changes and modifications to the disclosed embodiment thereof, will be readily apparent to those skilled in the art. For example, the capacitance-responsive oscillator 300 may be modified to detect changes in resistance as taught by U.S. Pat. No. 3,500,374 or to monitor some other electrical parameter or condition. The output signal of oscillator 100 may be set to maintain the load 700 normally energized instead of normally de-energized. Switching circuit 400 may be modified to have a higher or lower triggering voltage by the use of different transistors and biasing circuit components. The clamping circuit 500 may be comprised of all transistors or of all diodes or a combination of transistors and diodes different from what is shown in the schematic showing the preferred embodiment, but will still be operative to perform a voltage clamping function. Similarly, a switch other than a diode, as for example a transistor, may be used to open and close the discharge path to control capacitor 912. Circuit means other than a capacitor connected to an output of a transistor, can be used to detect the presence of a sawtooth voltage. A junction field effect transistor may be employed in lieu of the MOS FET 116, which is preferred because of its higher input (gate) impedence. It is the Applicants' intention to cover all of these and any other changes and modifications which could be made to the embodiment of the invention herein chosen for the purposes of the disclosure without departing from the spirit and scope of the invention.

What is claimed is:

1. A self-adjusting condition responsive control circuit comprising:

a. first circuit means operative in response to a control signal to provide a continually varying signal to compensate for slow variations from a reference level of a monitored parameter, and further operative to further vary said continually varying signal responsive to rapid variation from said reference level of said monitored parameter;

b. second circuit means operative to generate first and second signals in response to predetermined limits of said continuously varying signal;

c. third circuit means operative to clamp said first signal at a predetermined value; and d. fourth circuit means operative to receive said clamped signal and provide said control signal for said first circuit means.

2. A self-adjusting condition responsive control circuit according to claim 1 wherein said second circuit means comprises a transistor switch operative to provide a pulsed voltage as said first signal and a constant voltage as said second signal.

3. A self-adjusting condition responsive control circuit according to claim 2 wherein said switch is further operative to provide a sawtooth voltage as said first signal when said continuously varying signal is within predetermined limits and operative to provide said constant voltage when said continuously varying signal exceeds predetermined upper and lower limits.

4. A self-adjusting condition responsive control circuit according to claim 1 wherein said third circuit means comprises a transistor and other means connected to said transistor operative to clamp the transistor output at a maximum value.

5. A self-adjusting condition responsive control circuit according to claim 4 wherein said other means comprises a zener diode connected to the emitter of said transistor.

6. A self-adjusting condition responsive control circuit according to claim 1 wherein said fourth circuit means comprises switching means and means operative to alternately open and close said switching means.

7. A self-adjusting condition responsive control circuit according to claim 6 wherein said switching means comprises a diode and said means operative to alternately open and close said switching means comprises a transistor and bias means operative, in combination, in response to said clamped signal to forward and reverse bias said diode.

8. A self-adjusting condition responsive control circuit according to claim 7 wherein said fourth circuit means further comprises a control capacitor and charging and discharging means operative to charge and discharge said capacitor when said diode is forward and reversed biased, respectively.

9. A self-adjusting condition responsive control circuit according to claim 8 wherein said control capacitor is connected to said first circuit means and said control signal is generated by the charging and discharging of said capacitor.

10. A self-adjusting condition responsive control circuit comprising:

a. first circuit means operative in response to a control signal to provide a continually varying signal to compensate for slow variations from a reference level of a monitored parameter, and further operative to further vary said continually varying signal responsive to rapid variation from said reference level of said monitored parameter;
b. second circuit means operative to generate first and second signals in response to predetermined limits of said continuously varying signal;
c. third circuit means operative to clamp said first signal at a predetermined value;
d. fourth circuit means operative to receive said clamped signal and provide said control signal for said first circuit means; and
e. fifth circuit means operative to receive said clamped first signal and said second signal and, in response thereto to place a load in a first or second energization state, respectively.

11. A self-adjusting condition responsive control circuit according to claim 10 wherein said second circuit means comprises a transistor switch operative to provide a pulsed voltage as said first signal and a constant voltage as said second signal.

12. A self-adjusting condition responsive control circuit according to claim 11 wherein said switch is further operative to provide a sawtooth voltage as said first signal when said continuously varying signal is within predetermined limits and operative to provide said constant voltage when said continuously varying signal exceeds predetermined upper and lower limits.

13. A self-adjusting condition responsive control circuit according to claim 10 wherein said third circuit means comprises a transistor and other means connected to said transistor operative to clamp the transistor output at a maximum value.

14. A self-adjusting condition responsive control circuit according to claim 13 wherein said other means comprises a zener diode connected to the emitter of said transistor.

15. A self-adjusting condition responsive control circuit according to claim 10 wherein said fourth circuit means comprises switching means and means operative to alternately open and close said switching means.

16. A self-adjusting condition responsive control circuit according to claim 15 wherein said switching means comprises a diode and said means operative to alternately open and close said switching means comprises a transistor and bias means operative, in combination, in response to said clamped signal to forward and reverse bias said diode.

17. A self-adjusting condition responsive control circuit according to claim 16 wherein said fourth circuit means further comprises a control capacitor and charging and discharging means operative to charge and discharge said capacitor when said diode is forward and reversed biased, respectively.

18. A self-adjusting condition responsive control circuit according to claim 17 wherein said control capacitor is connected to said first circuit means and said control signal is generated by the charging and discharging of said capacitor.

19. A self-adjusting condition responsive control circuit according to claim 10 wherein said fifth circuit means comprises first and second transistors and a capacitor connected at the first transistor output, said first transistor and capacitor being operative in response to said clamped first signal to turn said second transistor on and operative in response to said second signal to turn said second transistor off.

20. A self-adjusting condition responsive control circuit comprising:

a. first circuit means operative in response to a control signal to provide a continually magnitude-varying signal to compensate for slow variations from a reference level of a monitored parameter, and further operative to further vary said continually varying signal responsive to rapid variation from said reference level of said monitored parameter;
b. second circuit means operative to generate first and second signals in response to predetermined magnitude limits of said continuously varying signal;
c. third circuit means operative to clamp said first signal at a predetermined value; and
d. fourth circuit means operative to receive said clamped signal and provide said control signal for said first circuit means.

* * * * *